(12) United States Patent
Kavlicoglu et al.

(10) Patent No.: US 8,820,492 B1
(45) Date of Patent: Sep. 2, 2014

(54) SOFT MATRIX MAGNETORHEOLOGICAL MOUNTS FOR SHOCK AND VIBRATION ISOLATION

(75) Inventors: Barkan Mehmet Kavlicoglu, Reno, NV (US); Yanming Liu, Reno, NV (US); Huseyin Sahin, Reno, NV (US); Bryce Wallis, Reno, NV (US)

(73) Assignee: Advanced Materials and Devices, Inc., Reno, NV (US)

( * ) Notice: Subject to any disclaimer, the term of this patent is extended or adjusted under 35 U.S.C. 154(b) by 274 days.

(21) Appl. No.: 12/873,099

(22) Filed: Aug. 31, 2010

Related U.S. Application Data (60) Provisional application No. 61/275,572, filed on Aug. 31, 2009.

(51) Int. Cl.
*F16F 9/53* (2006.01)

(52) U.S. Cl.
USPC ........................................ 188/267.2; 188/267

(58) Field of Classification Search
USPC ........ 188/267, 267.1, 267.2; 267/136, 140.15
See application file for complete search history.

(56) References Cited

U.S. PATENT DOCUMENTS

| | | | |
|---|---|---|---|
| 5,170,103 A | 12/1992 | Rouch et al. | |
| 5,421,129 A | 6/1995 | Sakamoto et al. | |
| 5,504,381 A | 4/1996 | Kato | |
| 5,595,372 A | 1/1997 | Patten | |
| 5,607,996 A * | 3/1997 | Nichols et al. | 524/439 |
| 5,609,353 A | 3/1997 | Watson | |
| 5,636,826 A | 6/1997 | Nakagaki et al. | |
| 5,792,948 A | 8/1998 | Aoki et al. | |
| 5,848,663 A | 12/1998 | Kuriki | |
| 5,899,443 A | 5/1999 | Su | |
| 5,906,254 A | 5/1999 | Schmidt et al. | |
| 6,022,005 A | 2/2000 | Gran et al. | |
| 6,123,312 A | 9/2000 | Dai | |
| 6,138,996 A | 10/2000 | Hayashi et al. | |
| 6,257,133 B1 * | 7/2001 | Anderson | 100/162 B |
| 6,286,644 B1 | 9/2001 | Wakui | |
| 6,378,672 B1 | 4/2002 | Wakui | |
| 6,923,298 B2 | 8/2005 | Tanner | |
| 7,086,507 B2 | 8/2006 | Hitchcock et al. | |
| 7,102,474 B2 | 9/2006 | Lerner et al. | |
| 7,140,478 B2 * | 11/2006 | Barvosa-Carter et al. | 188/267 |
| 7,192,014 B2 | 3/2007 | Nemoto | |
| 7,261,834 B2 | 8/2007 | Fuchs et al. | |
| 7,608,197 B2 | 10/2009 | Bose et al. | |
| 2004/0126565 A1 * | 7/2004 | Naganathan et al. | 428/323 |

* cited by examiner

*Primary Examiner* — Bradley King
*Assistant Examiner* — Stephen Bowes
(74) *Attorney, Agent, or Firm* — The Webb Law Firm (57) ABSTRACT

A soft-matrix magnetorheological material vibration isolation system includes a first mounting plate. A first layer of soft-matrix magnetorheological material has opposing first and second faces, the first face coupled to the first mounting plate. A first electromagnet has opposing first and second pole faces, the first pole face coupled to the second face of the first layer of soft-matrix magnetorheological material. A second layer of soft-matrix magnetorheological material has opposing first and second faces, the first face coupled to the second pole face of the first electromagnet. A second mounting plate is coupled to the second face of the second layer of soft-matrix magnetorheological material, the second mounting plate adapted to be coupled to a load mass.

19 Claims, 9 Drawing Sheets

SOFT MATRIX MAGNETORHEOLOGICAL MOUNTS FOR SHOCK AND VIBRATION ISOLATION

This invention was made with government support under contract No. N00030-08-C-0055 awarded by the United States Navy. The government has certain rights in the invention.

CROSS-REFERENCE TO RELATED APPLICATIONS

This application claims the benefit of U.S. Provisional Application Ser. No. 61/275,572, filed Aug. 31, 2009, the entirety of which is incorporated by reference herein.

BACKGROUND

1. Field of the Invention

The present invention relates to devices for providing shock and vibration isolation. More specifically, the present invention relates to soft matrix magnetorhelogical mounts for shock and vibration isolation.

2. The Prior Art

Devices for providing shock and vibration isolation are known in the art. A vibration isolation system prevents one object from affecting another from equipment using active or passive technology. Such systems are used extensively to isolate machinery (industrial and marine), civil engineering structures (base isolation in building, bridges, etc.), and sensitive components from the foundation/base. Vibration isolation schemes are to 1) reduce the propagation of base vibration to the isolated object (machinery) and 2) abate the transmission of vibration energy of machinery to the base. Moreover, in vehicular/marine, some industrial machines (such as mechanical presses), as well as seismic applications, isolators are also expected to lower the impact of shock from base to isolated object or vice-versa.

With passive methods, isolation is achieved by limiting the ability of vibrations to be coupled to the item to be isolated. This is done using a mechanical connection which dissipates or redirects the energy of vibration before it gets to the item to be isolated. Passive methods sometimes involve electromechanical controls for adjusting the system, but the isolation mechanism itself is passive. Passive systems may use elastomeric (rubber) or metal spring elements, fluids, or negative-stiffness components.

One of the most basic passive isolators is a spring placed between the surface transmitting shock or vibration and the item to be isolated. The spring opposes the impulse on it and absorbs some energy as it deforms. A fluid or elastomeric element is added to the spring element for damping. A simple example is the shock absorber in a car. In this case, mechanical energy from the shock or vibration does work on the fluid and is converted to thermal energy in the fluid, reducing the amount of energy transmitted to the body of the car. Elastomers are rubber-like materials which absorb mechanical energy by deforming. Examples of elastomeric isolators are shock and vibration mounts for automobile engines, aircraft components, industrial machinery, and building foundations. Because rubber does not have the same characteristics in all directions, isolation may be much better in one axis than the others.

With active methods, equal but opposite forces are created electronically using sensors and actuators to cancel out the unwanted vibrations. As early as the 1950s, active vibration cancellation systems were being developed for applications like helicopter seats. Thus, active control systems specifically for vibration control have been around for over 40 years. In the precision vibration control industry, active vibration isolation systems have been available for nearly 20 years.

One of the attractive applications in the use of active vibration is in engine mounting concept. The standard approach is to isolate the engine and the transmission vibrations from the chassis with rubber or hydro mounts. The active system is always a compromise between the conflicting requirements of acceptable damping and good isolation.

A soft-matrix magnetorheological (SMMR) material consists of micron/nano-sized ferrous particles suspended in a soft-matrix base material. The ferrous particles are embedded in the soft matrix and aligned by an external magnetic field while the matrix is cured. Once the SMMR material is cured, the rheological change occurs when a magnetic field causes the ferrous particles to polarize, and to attract each other; thus, changing the stiffness of the SMMR material. As magnetic field strength increases, the dipole moment created within the embedded ferrous particles increases, therefore, the attraction between the embedded particles increases. As stronger attraction forces are produced with increasing external magnetic field strength, the suspended particles form stiffer structured chain/columns that increase the stiffness of the SMMR material.

According to the present invention, the matrix material can be any flexible material in which the iron particles can be embedded. Such materials include, but are not limited to, silicone, natural rubber, nitrile, neoprene, ethylene propylene diene monomer (EPDM), styrene-butadiene rubber (SBR), fluorocarbon, viton, polybutadiene, fluorosilicone. Any compound of the listed materials can also be used as the matrix material. A controllable SMMR vibration isolation device can offer many advantages where vibration and shock isolation of mechanical systems with variable payload is critical. The presented devices can potentially be utilized in vertical support bushings, engine mounts, shock and vibration isolation in any mechanical system/structure, and sensitive equipment mounts that require shock and vibration isolation to improve their performance. Any system that is subjected to random disturbances can benefit from the proposed controllable shock and vibration isolator. The controllable SMMR devices presented in this invention can be used in conjunction with a feedback control system that ensures desired device response to a given vibration and shock input utilizing a control strategy.

The present invention can reduce and mitigate shock and vibration of a system that is subjected to variable loads. The invention can reduce the maximum transmitted acceleration, as well as, shift the natural frequency of a system under dynamic loads. Normally, when a load changes, a new shock and vibration isolator with certain stiffness properties is needed. The controllability feature of the present invention can eliminate the need for design of a new shock and vibration isolation device, when the payload of the system changes. The controllability of the present invention also eliminates the need for the design of a new shock and vibration isolation system, in case of a load change and the need for specific stiffness properties. Instead of a new design, the power input to the inventions can be varied to adjust the stiffness properties, which makes the invented devices extremely adaptable and reconfigurable.

BRIEF DESCRIPTION

A controllable SMMR shock and vibration isolation device according to the present invention includes a lower mount, an upper mount, multiple controllable SMMR devices, at least one electromagnet wound around a core. The lower mount of the SMMR shock and vibration isolation device can be fastened to a chassis. A vibrating mass to be protected from shock and vibration can be fastened to the upper mount.

When a shock or vibration input occurs, electric current is supplied to the electromagnets to produce a magnetic field exerted on the SMMR in order to vary the stiffness and damping of the device. The magnetic field lines across the SMMR should be parallel to the orientation of iron particles embedded in the SMMR.

The electric current should be supplied in reverse direction to each electromagnet, so that the magnetic field lines form a closed loop that starts from any one of the cores and travels through other components and completes the loop. The strength of the magnetic field lines is proportional to the supplied electric current. As the electric current is varied, so is the magnetic field strength. This variation of the magnetic field strength causes the stiffness of the SMMR to change. A change in the stiffness of the SMMR will result in a change in the stiffness of the device. The stiffness change is controllable and reversible. The device can be used by itself, or multiple devices can be combined in series or parallel to meet different system requirements.

DETAILED DESCRIPTION

Persons of ordinary skill in the art will realize that the following description of the present invention is illustrative only and not in any way limiting. Other embodiments of the invention will readily suggest themselves to such skilled persons.

Any of the controllable SMMR material shock and vibration isolation devices disclosed herein can be rigidly connected between a frame/chassis and a vibrating mass, where the frame/chassis is subjected to a vibration input. The device is also connected to a power supply which is connected to a control system. The device needs to be equipped with vibration sensors that feedback the sensor signals of the frame/chassis and vibrating mass, respectively, to the control system. Based on the sensor signals, the power supply provides electric current to the SMMR device. Upon application of the electric current, a magnetic field is generated across the SMMR device to control the stiffness of the SMMR device.

Figure 1:
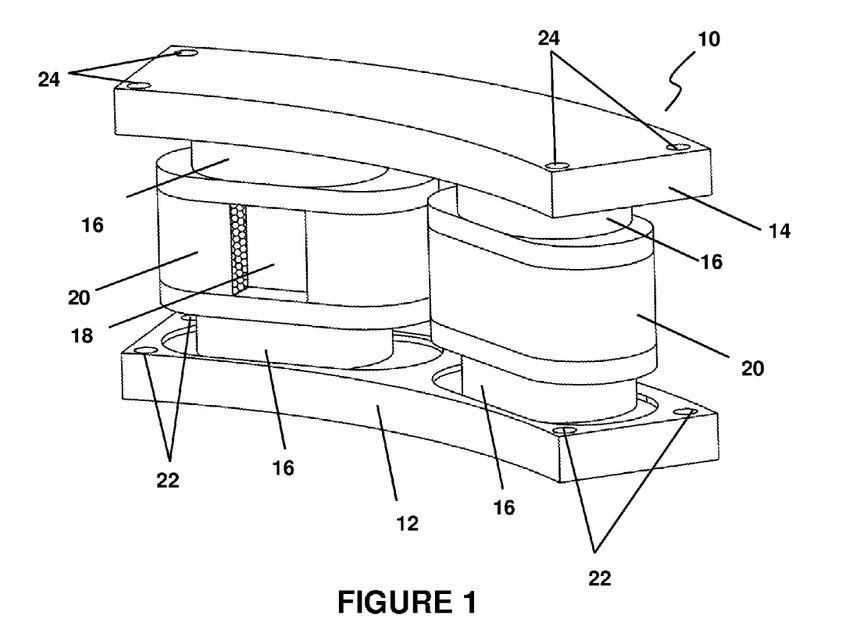
FIG. 1 is an isometric view of an illustrative controllable shock and vibration isolation device according to one aspect of the present invention.

Referring first to FIG. 1, one embodiment of an SMMR device 10 is composed of a lower mounting plate 12, an upper mounting plate 14, multiple controllable SMMR 16 at least one electromagnet core 18 around which electromagnet coils 20 are wound. The embodiment of FIG. 1 is shown including two electromagnet assemblies, the electromagnet coil 20 of the leftmost one of which is shown cut away to show the core 18 around which electromagnet coil 20 is wound.

The SMMR device 10 of FIG. 1 can be fastened to a chassis or other frame by, for example, bolts through a number of bolt holes 22 located on the lower mounting plate 12. Similarly, the device 10 can be rigidly connected to a vibrating mass to be protected from shock and vibration input by means of, for example, bolts through bolt holes 24 located on the upper mounting plate 14. As will be appreciated by persons of ordinary skill in the art, other mounting methods may be used to assemble the devices of the present invention. Lower and upper mounting plates 12 and 14 are shown in FIG. 1 having an arcuate shape so that a plurality of them can be used together to form a circular assembly, but persons of ordinary skill in the art will appreciate that they could be formed in other shapes, for example rectangular.

In an illustrative embodiment, the SMMRs shown in FIG. 1 may have about 70% by weight iron particles embedded in silicon elastomer. Typically to be able to obtain an effective magnetorheological effect, the weight percent of the iron particles can be varied between about 10-80%. The thickness of the SMMRs in an actual embodiment of the kind shown in FIG. 1 is 0.5 inches. The thickness of such materials can vary between about $\frac{1}{32}$ inches up to about 1 inch. As the SMMR thickness increases, the magnetic field strength across the SMMR is reduced for a given power input. Usually, the magnetic field strength in SMMR materials is between 0-1.5 Tesla. As will be appreciated by persons of ordinary skill in the art, as the iron particle content decreases, so does the maximum field strength that can be induced on the SMMR material. Persons of ordinary skill in the arty will also appreciate that the mount design shown in FIG. 1 (as well as in the other embodiments disclosed herein) is scalable.

When a shock or vibration input occurs, the built-in electromagnets can produce a magnetic field exerted on the SMMR 16 in order to vary the stiffness and damping of the device 10 upon application of the an electric current. The magnetic field lines across the SMMR 16 should be parallel to the orientation of iron particles embedded in the SMMR 16.

Figure 3:
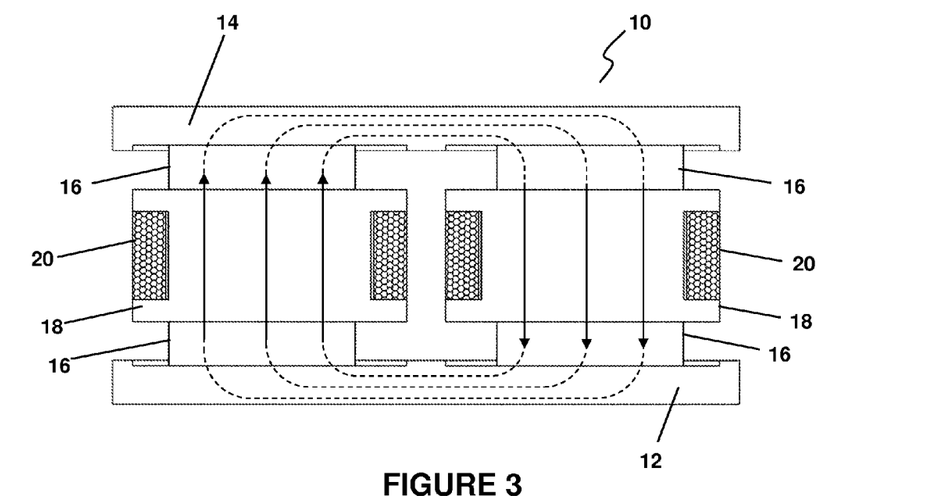
FIG. 3 is a diagram showing a cross-sectional view of the embodiment of FIG. 1 further illustrating magnetic lines of force through device 10 when electromagnet coils 20 are energized.

In the SMMR device 10, the electric current should be supplied in reverse direction to each electromagnet 20, so that the magnetic field lines form a closed loop that starts from any one of the cores 20 and travels through other components and completes the loop. The strength of the magnetic field lines is proportional to the supplied electric current. As the electric current is varied, so is the magnetic field strength. This variation of the magnetic field strength causes the stiffness of the SMMR 16 to change. A change in the stiffness of the SMMR 16 will result in a change in the stiffness of the device 10. The stiffness change is controllable and reversible. FIG. 3 is a diagram showing a cross-sectional view of the embodiment of FIG. 1 further illustrating magnetic lines of force through device 10 when electromagnet coils 20 are energized.

Figure 2:
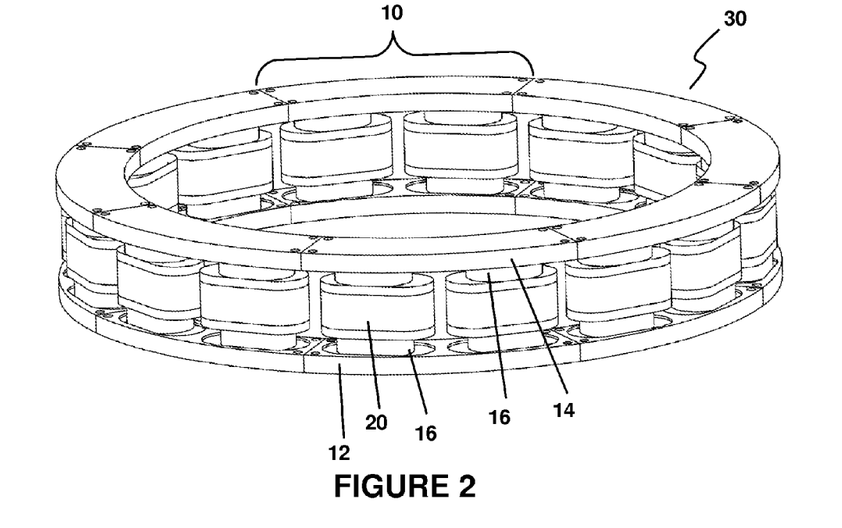
FIG. 2 is an isometric view of a controllable shock and vibration isolation device formed by connecting multiple devices of FIG. 1.

The device 10 can be used by itself, or multiple devices can be combined in series or parallel to meet different system requirements. For example, FIG. 2 is a diagram that shows a shock and vibration absorber device 30 where eight of the same devices 10 are connected end to end to form a circular shape. The number of devices 10 can be varied according to the requirements of any particular application. In an actual example of a device shown in FIG. 2, the device has an inner diameter of 16 inches with an outer diameter of 19.5 inches.

Figure 4:
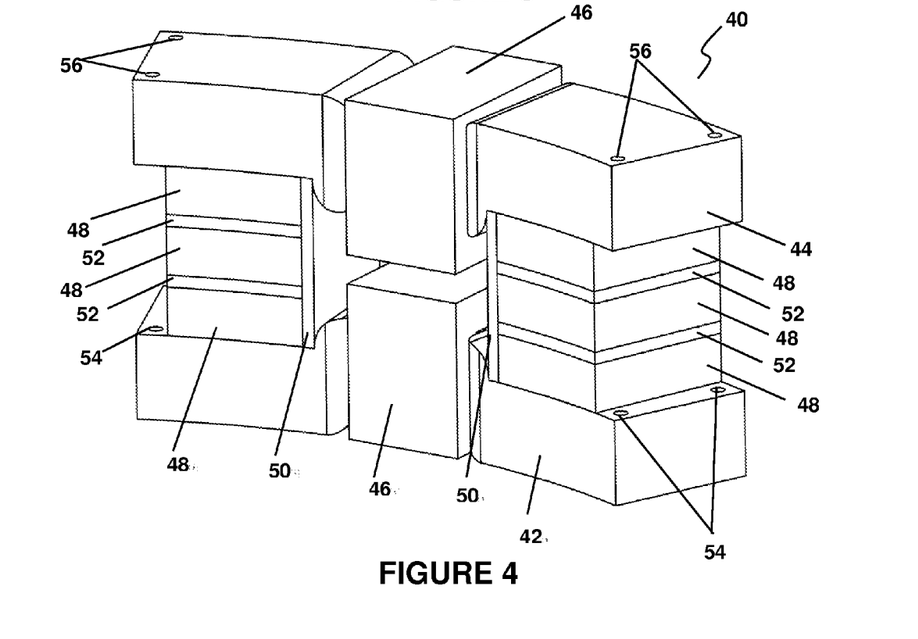
FIG. 4 is an isometric view of an alternate design configuration of a device according to the present invention.

According to another embodiment of the present invention shown in FIG. 4, it may be seen that the location of the electromagnets, and the number and geometry of the SMMR layers can be varied to accommodate different needs. In the example shown in FIG. 4, the controllable SMMR shock and vibration isolation device 40 is composed of a lower mounting plate 42, an upper mounting plate 44, two electromagnets 46, multiple controllable SMMR 48, a magnetic isolation material 50, and rigid shims 52 between the SMMR layers 48. The electromagnets 46 are wound around the lower and upper mounting plates 42 and 44, respectively. The SMMR device 40 can be attached to a chassis through a number of bolt holes 54 located on the lower mounting plate 42. Similarly, the device 40 can be rigidly connected to a vibrating mass that should be protected from shock and vibration input by means of bolt holes 56 located on the upper mounting plate 44.

The operating mechanism of the device 40 of FIG. 4 is the same as described in the embodiment of FIG. 1. When a vibration input occurs, the built-in electromagnets can produce a magnetic field exerted on the SMMR 48 in order to vary the stiffness of the device 40 upon application of the electric current. The magnetic field across the SMMR 48 should be parallel to the orientation of the iron particles embedded in the SMMR 48.

In the device 40, the electric current should be supplied in opposite directions to each electromagnet 46, so that the magnetic field lines form a closed loop that starts from any one of the mounting plate 42 or 44 and travels through other components to complete the loop. As will be appreciated by persons of ordinary skill in the art, the strength of the magnetic field is proportional to the supplied electrical current. As the electric current is varied, so is the magnetic field strength. This variation of the magnetic field strength causes the stiffness of the SMMRs 48 to change. A change in the stiffness of the SMMRs 48 results in a change in the stiffness of the device 40. The stiffness change is controllable and reversible.

Figure 5:
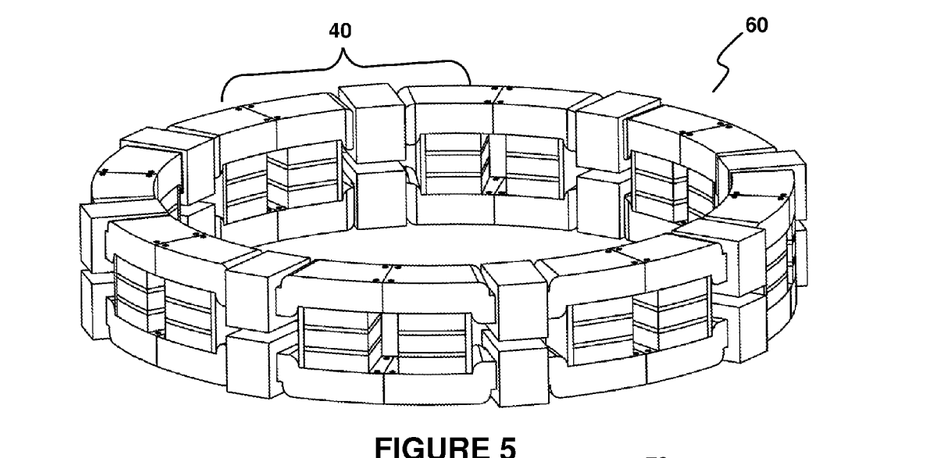
FIG. 5 is an isometric view of a controllable shock and vibration isolation device formed by connecting multiple devices of FIG. 4.

The device 40 can be used by itself, or multiple devices can be combined in series or parallel to meet different system requirements. For example, FIG. 5 demonstrates a shock and vibration absorber device 60 where eight of the devices 40 are connected in parallel to form a circular shape. As will be appreciated by persons of ordinary skill in the art, the number of devices 40 can be varied based on the requirements.

Figure 6:
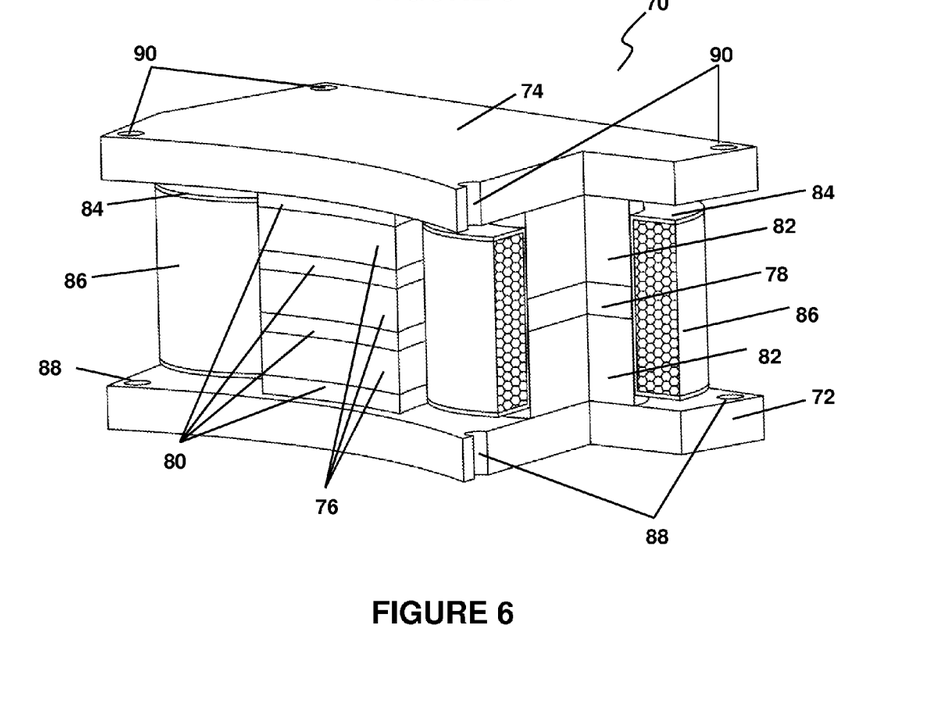
FIG. 6 is an isometric view of another alternate design configuration of the invention.

Another controllable shock and vibration isolation device configuration is presented in FIG. 6. The controllable SMMR shock and vibration isolation device 70 shown in FIG. 6 is composed of a lower mounting plate 72, an upper mounting plate 74, multiple controllable SMMR 76 and 78, rigid shims 80 between the SMMR layers 76, cores 82, two electromagnets including, electromagnet spools 84 around which the electromagnet coils 86 are wound around. The SMMR 78 are located between electromagnet cores 82 which are located within the electromagnet spool 84. The SMMR device 70 can be rigidly attached to a chassis through a number of bolt holes 88 located on the lower mounting plate 72 Similarly, the device 70 can be rigidly connected to the vibrating mass that should be protected from shock and vibration input by means of bolt holes 90 located on the upper mounting plate 74.

When a vibration input occurs, the built-in electromagnets create a magnetic field exerted on the SMMRs 76 and 78 in order to vary the stiffness of the device 70 upon application of the electric current. The magnetic field lines across the SMMRs 76 and 78 should be parallel to the orientation of the iron particles embedded in the SMMRs 76 and 78.

In the device depicted in FIG. 6, the electric current should be supplied in the same direction to each electromagnet coil 86, so that the magnetic field lines form a closed loop that starts from any one of the cores 82 and travels through other components and completes the loop. The strength of the magnetic field is proportional to the supplied electric current. As the electric current is varied, so is the magnetic field strength. This variation of the magnetic field strength causes the stiffness of the SMMRs 76 and 78 to change. A change in the stiffness of the SMMRs 76 and 78 results in change in the stiffness of the device 70. The stiffness change is controllable and reversible.

Figure 7:
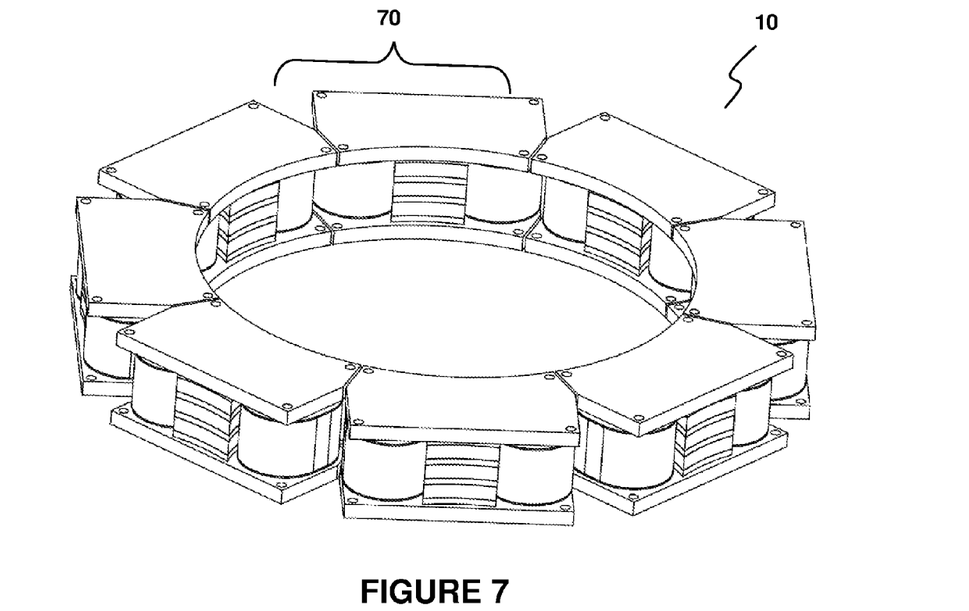
FIG. 7 is an isometric view of a controllable shock and vibration isolation device that is formed by connecting multiple devices of FIG. 6.

The device 70 can be used by itself, or combined in series or parallel to meet different system requirements. For example, FIG. 7 illustrates a shock and vibration absorber device 100 where eight of the devices 70 are connected in parallel to form a circular shape. The number of devices 70 can be varied according to the requirements of any particular application.

Figure 8:
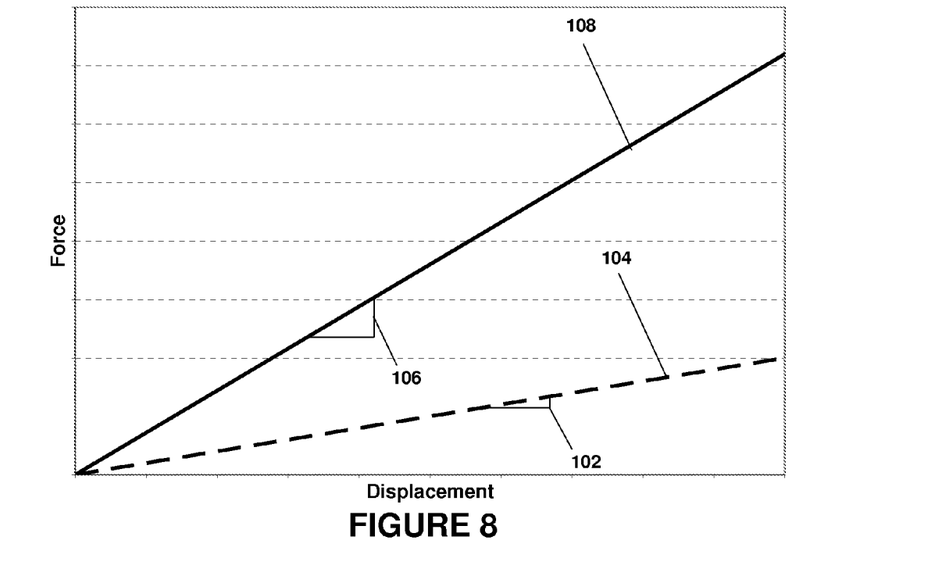
FIG. 8 is a graph showing the force-displacement characteristic of the embodiments of the invention presented in FIGS. 1 through 7.

The force-displacement characteristic of the devices 10, 40, and 70 is shown in the graph of FIG. 8 where the slope of the presented force-displacement curves is equal to the stiffness. When a certain compressive load is applied, each SMMR device 10, 40, and 70 is displaced. The off-state stiffness 102 is obtain as the slope of the "no electric current force-displacement curve" 104. The maximum on-state stiffness 106 is calculated as the slope of the "force displacement curve at the maximum permissible electric current" 108. The stiffness of the devices 10, 40, and 70 can be controlled and varied between the off-state stiffness 102 and the maximum on-state stiffness 106 values by controlling the electric current through the control system.

The devices 10, 40, and 70 described above have only a "one-way" control of stiffness, i.e., the stiffness can only be varied between the off-state stiffness 102 and the maximum on-state stiffness 106 of FIG. 8. The devices 10, 40, and 70 can be modified where a "two-way" control of stiffness is desired, i.e., the stiffness can be either higher or lower than the "off-state stiffness" 102.

Figure 9:
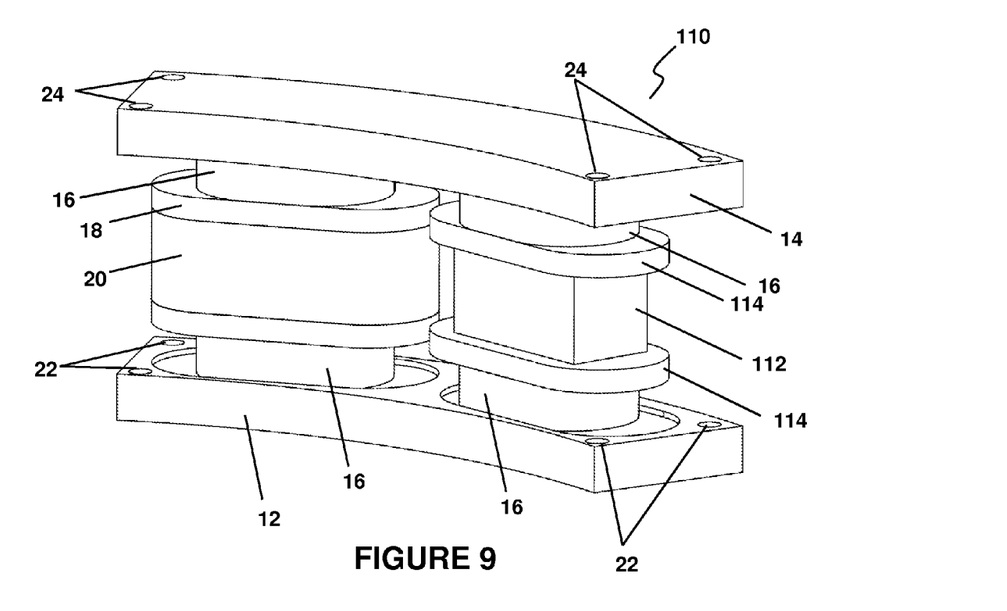
FIG. 9 is an isometric view of a device like that presented in FIG. 1 that is modified to provide bi-directional stiffness control.

FIG. 9 is an isometric drawing of an SMMR device 110 that provides "bi-directional" action. SMMR device 110 is a modification of SMMR device 10 of FIG. 1. The reference numerals used in FIG. 1 are used to designate like elements in the embodiment shown in FIG. 9. Either one of the electromagnet coil and core assemblies of the device 10 of FIG. 1 is replaced by permanent magnet 112 and shims 114. Otherwise all other components are the same as device 10 in FIG. 1.

In the bi-directional device 110, the permanent magnet 112 produces off-state magnetic field lines across the device 110 with no electric current supplied. When a positive electric current (i.e., a current that can generate magnetic field in the same direction as the permanent magnet 112) is supplied to the electromagnet coil 20 of the bi-directional device 110, it is possible to increase the strength of the magnetic field lines, which increases the stiffness of the bi-directional device 110. However, when a negative electric current (i.e., a current that can generate magnetic field in the opposite direction as the permanent magnet 112) is supplied, the strength of the magnetic field lines can be reduced, which decreases the stiffness of the bi-directional device 110.

Figure 10:
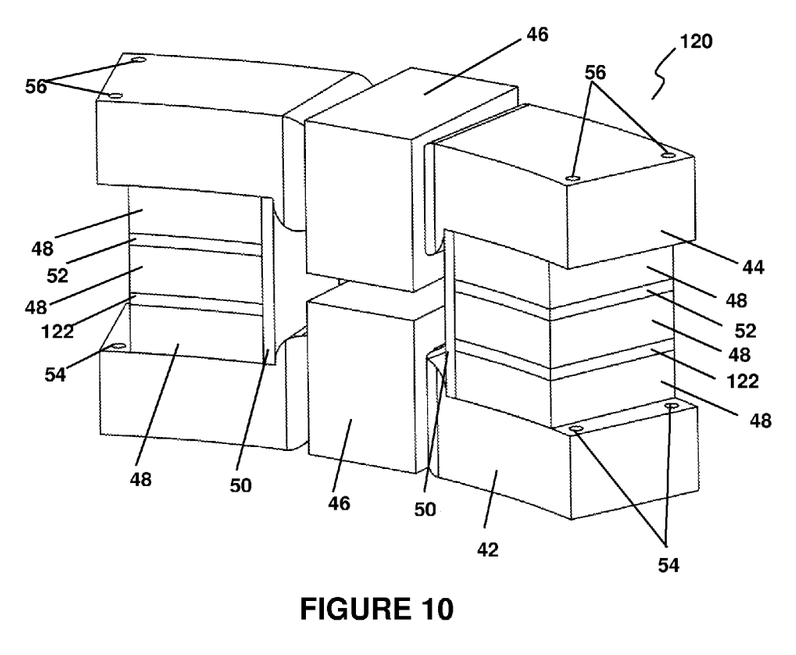
FIG. 10 presents an isometric view of the device presented in FIG. 4 modified to provide bi-directional stiffness control when the shims are replaced with permanent magnets in order to provide bi-directional stiffness control.

A similar modification to SMMR device 40 of FIG. 4 in order to obtain bi-directional stiffness control is also possible. FIG. 10 illustrates an embodiment of an SMMR device 120 where the rigid shims 52 between the SMMR pieces 48 shown in FIG. 4 can be replaced with permanent magnets 122 keeping all other components the same as device 40 of FIG. 4. By replacing the shims 52, the permanent magnets 122 create an off-state magnetic field distribution across the device 120 with no electric current supplied. When a positive electric current (i.e., an electric current that can generate magnetic field in the same direction as the permanent magnets 122) is supplied to the electromagnets of the bi-directional device 120, it is possible to increase the strength of the magnetic field lines, which increases the stiffness of the bi-directional device 120. However, when a negative electric current (i.e., an electric current that can generate magnetic field in the opposite direction as the permanent magnets 122) is supplied, the strength of the magnetic field lines can be reduced, which decreases the stiffness of the bi-directional device 120.

Figure 11:
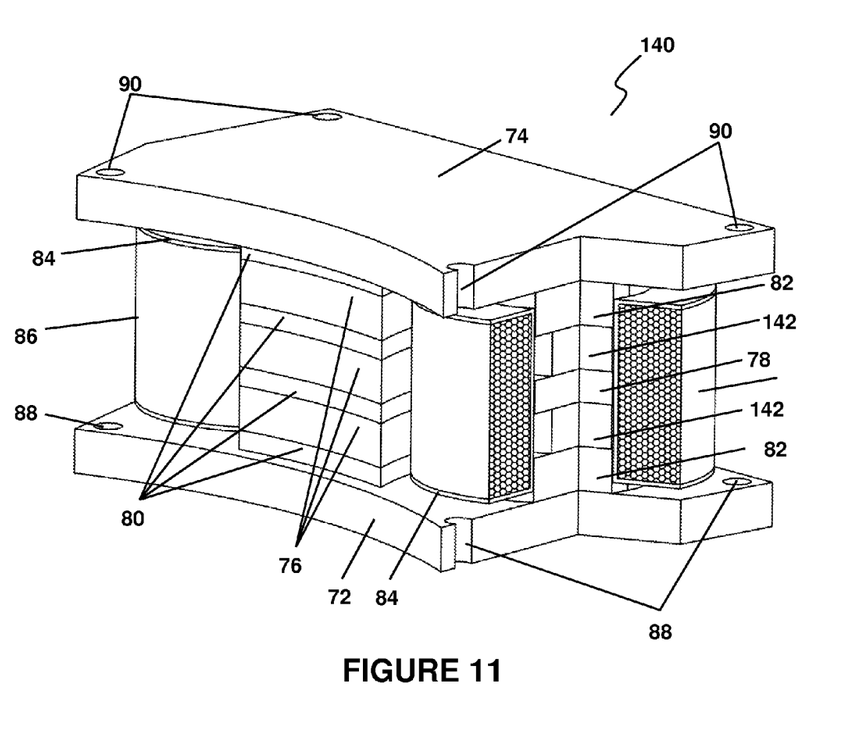
FIG. 11 presents an isometric view of the device presented in FIG. 6 modified to provide bi-directional stiffness control.

Referring now to FIG. 11, a bi-directional device 140 is shown, where part of the electromagnet assembly of the device 70 of FIG. 6 is replaced with permanent magnets 142 while all other components are the same as in device 70 of FIG. 6 as indicated by the use of the same reference numerals for those components as were used in FIG. 6. By replacing part of the cores 82, the permanent magnets 142 produce off-state magnetic field lines across the device 70 with no electric current supplied. When a positive electric current (i.e., an electric current that can generate magnetic field in the same direction as the permanent magnets 142) is supplied to the electromagnets of the bi-directional device 140, it is possible to increase the strength of the magnetic field lines, which increases the stiffness of the bi-directional device 140. However, when a negative electric current (i.e., an electric current that can generate magnetic field in the opposite direction as the permanent magnets 142) is supplied, the strength of the magnetic field lines can be reduced, which decreases the stiffness of the bi-directional device 140.

Figure 12:
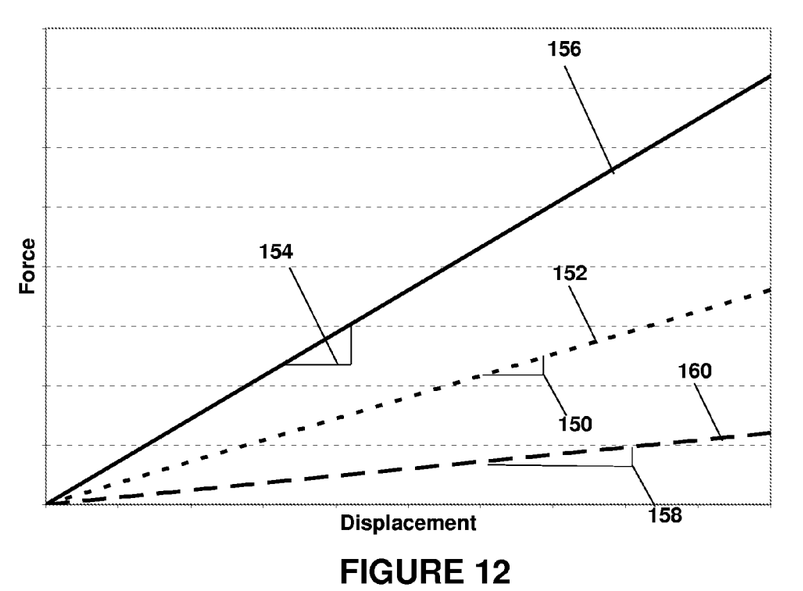
FIG. 12 is a graph showing the force-displacement characteristic of the inventions presented in FIGS. 9, 10, and 11 to demonstrate bi-directional stiffness control.

The force-displacement characteristic of the devices 110, 120, and 140 of FIGS. 9, 10, and 11 is demonstrated in the graph of FIG. 12 where the slope of the presented curves is equal to the stiffness. The off-state stiffness 150 is calculated as the slope of the "no electric current force-displacement curve" 152. The maximum on-state stiffness 154 is calculated as the slope of the "maximum permissible positive electric current force displacement curve" 156. The minimum on-state stiffness 158 is calculated as the slope of the "maximum permissible negative electric current force displacement curve" 160. The stiffness of the devices 110, 120, and 140 can be controlled between the minimum on-state stiffness 158 and the maximum on-state stiffness 156 values by controlling the electric current through the control system to which the SMMR devices are connected. When there is no current, the bi-directional devices 110, 120, and 140 have the off-state stiffness 150 due to the permanent magnet effect.

Figure 13:
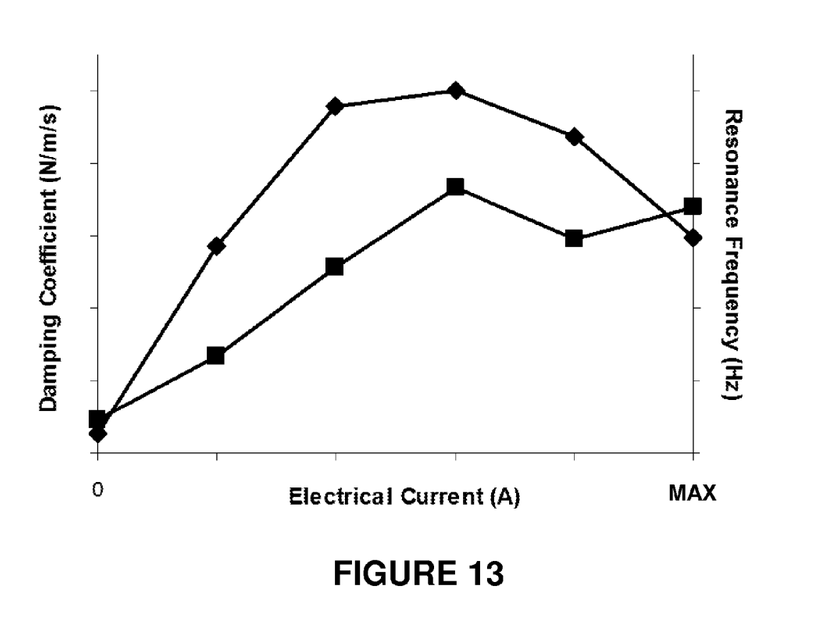
FIG. 13 is a graph showing both the damping coefficient characteristic and the resonant frequency control of the inventions presented in FIGS. 2, 4, and 6.

All devices disclosed herein have similar force-displacement characteristics as demonstrated in FIG. 8 and FIG. 12, depending on the design configuration. These devices can reduce the displacement and acceleration transmissibility of a vibrating system, as well as shift its natural frequency. In addition to stiffness controllability, the damping coefficient of the devices disclosed herein is also controllable. FIG. 13 presents how the damping coefficient 162 of the devices 10, 40, and 70 varies by changing the amount of electrical current supplied. The damping coefficient increases up to a certain value and reduces upon further increase in the electrical current. This is due to the fact that the stiffness increase dominates and limits the increase in damping coefficient. Moreover, depending on how the stiffness and damping coefficient change, the resonant frequency 164 of the vibrating system also varies as demonstrated in FIG. 13.

Figure 14:
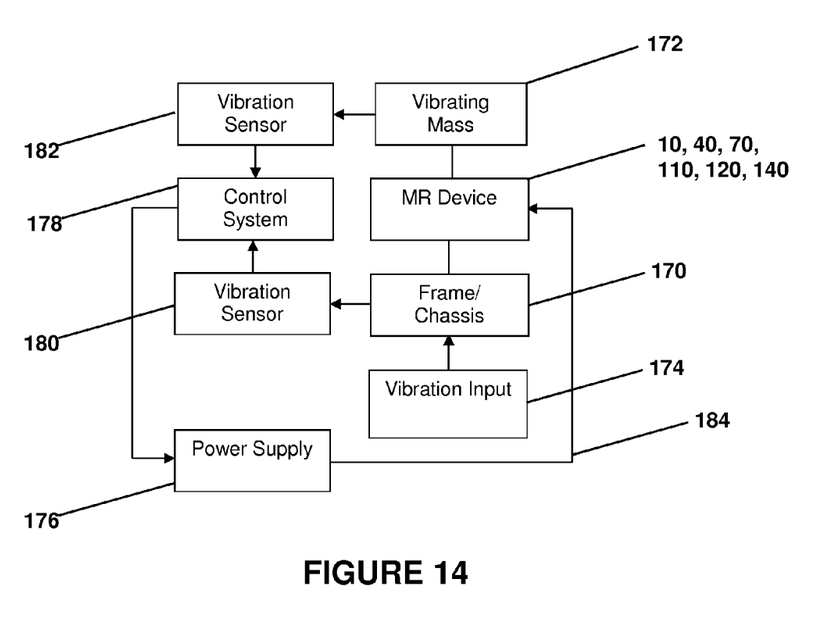
FIG. 14 is a block diagram of an illustrative system employing SMMR devices according to the present invention.

As illustrated in the block diagram of FIG. 14, any of the controllable SMMR material shock and vibration isolation devices 10, 40, 70, 110, 120, and 140 disclosed herein can be rigidly connected between a frame/chassis 170 and a vibrating mass 172, where the frame/chassis 170 is subjected to a vibration input 174, as shown in FIG. 14. The SMMR device is also connected to a power supply 176 which is connected to a control system 178. The device needs to be equipped with vibration sensors 180 and 182 that feedback the sensor signals of frame/chassis 170 and vibrating mass 172, respectively, to the control system '178 Based on the signals from sensors 180 and 182, the power supply 178 provides electric current shown at reference numeral 184 to the SMMR device. Upon application of the electric current 184 a magnetic field is generated across the device. It is due to this magnetic field that the stiffness of the device is controllable.

The present invention can reduce and mitigate shock and vibration of a system that is subjected to variable loads. The present invention can reduce the maximum transmitted acceleration, as well as, shift the natural frequency of a system under dynamic loads. Normally, when a load changes, a new shock and vibration isolator with certain stiffness properties is needed. The controllability feature of the present inventions can eliminate the need for design of a new shock and vibration isolation device, when the payload of the system changes. The controllability of the present inventions also eliminates the need for the design of a new shock and vibration isolation system, in case of a load change and the need for specific stiffness properties. Instead of a new design, the power input to the inventions can be varied to adjust the stiffness properties, which makes the invented devices extremely adaptable and reconfigurable.

While embodiments and applications of this invention have been shown and described, it will be apparent to those skilled in the art that many more modifications than mentioned above are possible without departing from the inventive concepts herein. The invention, therefore, is not to be restricted except in the spirit of the appended claims.

What is claimed is:
1. A soft-matrix magnetorheological material vibration isolation system comprising:
 a first mounting plate having a flat surface;
 a second mounting plate having a flat surface;
 a first layer of soft-matrix magnetorheological material having a body that consists of a planar form and having opposing first and second faces, substantially an entire surface of the first face directly connected to the flat surface of the first mounting plate;

a second layer of soft-matrix magnetorheological material having a body that consists of a planar form and having opposing first and second faces, substantially an entire surface of the first face directly connected to the second mounting plate; and a first electromagnet having opposing first and second pole faces, the first pole face connected to substantially an entire surface of the second face of the first layer of soft-matrix magnetorheological material, and the second pole face connected to substantially an entire surface of the second face of the second layer of soft-matrix magnetorheological material.

2. The soft-matrix magnetorheological material vibration isolation system of claim 1, further comprising:

a third layer of soft-matrix magnetorheological material having a body that consists of a planar form and having opposing first and second faces, substantially an entire surface of the first face directly connected to the first mounting plate;

a fourth layer of soft-matrix magnetorheological material having a body that consists of a planar form and having opposing first and second faces, substantially an entire surface of the first face directly connected to the second mounting plate; and a second electromagnet having opposite first and second pole faces, the first pole face connected to substantially an entire surface of the second face of the third layer of soft-matrix magnetorheological material, and the second pole face connected to substantially an entire surface of the second face of the fourth layer of soft-matrix magnetorheological material;

wherein the first and second electromagnets are oriented such that opposite pole faces of the first and second electromagnets are coupled to each of the first and second mounting plates.

3. The soft-matrix magnetorheological material vibration isolation system of claim 1, further comprising:

a first vibration sensor coupled to the first mounting plate;

a second vibration sensor adapted to be coupled to a load mass coupled to the second mounting plate; and a control system coupled to the first and second vibration sensors;

a current source coupled to the first electromagnet and to the control system and adapted to supply an electrical current to the first electromagnet as a function of signals from the first and second vibration sensors.

4. The soft-matrix magnetorheological material vibration isolation system of claim 1, further comprising:

a third layer of soft-matrix magnetorheological material having opposing first and second faces, the first face directly connected to the first mounting plate;

a fourth layer of soft-matrix magnetorheological material having opposing first and second faces, the first face directly connected to the second mounting plate; and a permanent magnet having opposite first and second pole faces, the first pole face connected to the second face of the third layer of soft-matrix magnetorheological material and the second pole face of the permanent magnet connected to the second face of the fourth layer of soft-matrix magnetorheological material.

5. The soft-matrix magnetorheological material vibration isolation system of claim 4, further comprising:

a first vibration sensor coupled to the first mounting plate;

a second vibration sensor adapted to be coupled to a load mass coupled to the second mounting plate;

a control system coupled to the first and second vibration sensors; and a current source coupled to the first electromagnet and to the control system and adapted to supply an electrical current to the first electromagnet as a function of signals from the first and second vibration sensors, the electrical current flowing in a first direction to increase stiffness of the soft-matrix magnetorheological material vibration isolation system, and the electrical current flowing in a second direction to decrease the stiffness of the soft-matrix magnetorheological material vibration isolation system.

6. A soft-matrix magnetorheological material vibration isolation system comprising:

a first mounting plate;

a second mounting plate adapted to be connected to a load mass; and a plurality of soft-matrix magnetorheological material vibration isolation elements mounted in a ring configuration disposed between and mounted to the first and second mounting plates, each soft-matrix magnetorheological material vibration isolation element including:

a first layer of soft-matrix magnetorheological material having a body that consists of a planar form and having opposing first and second faces, substantially an entire surface of the first face directly connected to the first mounting plate;

a second layer of soft-matrix magnetorheological material having a body that consists of a planar form and having opposing first and second faces, substantially an entire surface of the first face directly connected to the second mounting plate; and a single electromagnet having opposing first and second pole faces, the first pole face connected to substantially an entire surface of the second face of the first layer of soft-matrix magnetorheological material, and the second pole face connected to substantially an entire surface of the second face of the second layer of soft-matrix magnetorheological material.

7. The soft-matrix magnetorheological material vibration isolation system of claim 6, further comprising:

a first vibration sensor coupled to the first mounting plate;

a second vibration sensor adapted to be coupled to a load mass coupled to the second mounting plate;

a control system coupled to the first and second vibration sensors; and a current source coupled to the single electromagnet of each soft-matrix magnetorheological material vibration isolation element and to the control system and adapted to supply an electrical current to the single electromagnet of each soft-matrix magnetorheological material vibration isolation element as a function of signals from the first and second vibration sensors.

8. A soft-matrix magnetorheological material vibration isolation system comprising:

a first mounting plate;

a first layer of soft-matrix magnetorheological material having a body that consists of a planar form and having opposing first and second faces, substantially an entire surface of the first face coupled to the first mounting plate;

a first electromagnet having opposing first and second pole faces, substantially an entire surface of the first pole face coupled to the second face of the first layer of soft-matrix magnetorheological material;

a second layer of soft-matrix magnetorheological material having a body that consists of a planar faun and having opposing first and second faces, substantially an entire surface of the first face coupled to the second pole face of the first electromagnet; and a second mounting plate coupled to the second face of the second layer of soft-matrix magnetorheological material, the second mounting plate adapted to be coupled to a load mass.

9. The soft-matrix magnetorheological material vibration isolation system of claim 8, further comprising:

a third layer of soft-matrix magnetorheological material having a body that consists of a planar form and having opposing first and second faces, substantially an entire surface of the first face coupled to the first mounting plate;

a second electromagnet having opposite first and second pole faces, substantially an entire surface of the first pole face coupled to the second face of the third layer of soft-matrix magnetorheological material; and a fourth layer of soft-matrix magnetorheological material having a body that consists of a planar form and having opposing first and second faces, substantially an entire surface of the first face coupled to the second pole face of the second electromagnet and the second face coupled to the second mounting plate;

wherein the first and second electromagnets are oriented such that opposite pole faces of the first and second electromagnets are coupled to each of the first and second mounting plates.

10. The soft-matrix magnetorheological material vibration isolation system of claim 8, further comprising:

a first vibration sensor coupled to the first mounting plate;

a second vibration sensor adapted to be coupled to a load mass coupled to the second mounting plate;

a control system coupled to the first and second vibration sensors;

a current source coupled to the first electromagnet and to the control system and adapted to supply an electrical current to the first electromagnet as a function of signals from the first and second vibration sensors.

11. The soft-matrix magnetorheological material vibration isolation system of claim 8, further comprising:

a third layer of soft-matrix magnetorheological material having opposing first and second faces, the first face coupled to the first mounting plate;

a fourth layer of soft-matrix magnetorheological material having opposing first and second faces, the first face coupled to the second mounting plate; and a permanent magnet having opposite first and second pole faces, the first pole face coupled to the second face of the third layer of soft-matrix magnetorheological material, and the second pole face of the permanent magnet coupled to the second face of the fourth layer of soft-matrix magnetorheological material.

12. The soft-matrix magnetorheological material vibration isolation system of claim 8, further comprising:

a first vibration sensor coupled to the first mounting plate;

a second vibration sensor adapted to be coupled to a load mass coupled to the second mounting plate;

a control system coupled to the first and second vibration sensors;

a current source coupled to the first electromagnet and to the control system and adapted to supply an electrical current to the first electromagnet as a function of signals from the first and second vibration sensors, the electrical current flowing in a first direction to increase stiffness of the soft-matrix magnetorheological material vibration isolation system, and the electrical current flowing in a second direction to decrease the stiffness of the soft-matrix magnetorheological material vibration isolation system.

13. A soft-matrix magnetorheological material vibration isolation system comprising:

a first mounting plate;

a second mounting plate adapted to be coupled to a load mass;

a plurality of soft-matrix magnetorheological material vibration isolation elements mounted in a ring configuration disposed between and mounted to the first and second mounting plates, each soft-matrix magnetorheological material vibration isolation element including:

a first layer of soft-matrix magnetorheological material having a body that consists of a planar form and having opposing first and second faces, substantially an entire surface of the first face coupled to the first mounting plate;

a second layer of soft-matrix magnetorheological material having a body that consists of a planar form and having opposing first and second faces, substantially an entire surface of the first face coupled to the second mounting plate; and a single electromagnet having opposing first and second pole faces, the first pole face coupled to substantially an entire surface of the second face of the first layer of soft-matrix magnetorheological material, and the second pole face coupled to substantially an entire surface of the second face of the second layer of soft-matrix magnetorheological material.

14. The soft-matrix magnetorheological material vibration isolation system of claim 13, further comprising:

a first vibration sensor coupled to the first mounting plate;

a second vibration sensor adapted to be coupled to a load mass coupled to the second mounting plate;

a control system coupled to the first and second vibration sensors;

a current source coupled to the single electromagnet of each soft-matrix magnetorheological material vibration isolation element and to the control system and adapted to supply an electrical current to the single electromagnet of each soft-matrix magnetorheological material vibration isolation element as a function of signals from the first and second vibration sensors.

15. A soft-matrix magnetorheological material vibration isolation system comprising:

a first mounting plate;

a second mounting plate adapted to be connected to a load mass;

a first layer of soft-matrix magnetorheological material coupled to the first mounting plate;

a second layer of soft-matrix magnetorheological material coupled to the second mounting plate; and a first electromagnet including a coil of wire wrapped around a magnetic core having opposing first and second pole faces, the first pole face coupled to the first mounting plate through the first layer of soft-matrix magnetorheological material, the second pole face coupled to the second mounting plate through the second layer of soft-matrix magnetorheological material, the magnetic core being spool shaped and having outer flanges, the coil of wire being wrapped around the magnetic core in a region inside of the flanges.

16. The soft-matrix magnetorheological material vibration isolation system of claim 15, further comprising:

a first vibration sensor coupled to the first mounting plate;

a second vibration sensor adapted to be coupled to a load mass coupled to the second mounting plate;

a control system coupled to the first and second vibration sensors;

a current source coupled to the first electromagnet and to the control system and adapted to supply an electrical current to the first electromagnet as a function of signals from the first and second vibration sensors.

17. The soft-matrix magnetorheological material vibration isolation system of claim 15, further comprising:

a third layer of soft-matrix magnetorheological material coupled to the first mounting plate;

a fourth layer of soft-matrix magnetorheological material coupled to the second mounting plate; and a second electromagnet including a coil of wire wrapped around a magnetic core having opposing first and second pole faces, the first pole face coupled to the first mounting plate through the third layer of soft-matrix magnetorheological material, the second pole face coupled to the second mounting plate through the fourth layer of soft-matrix magnetorheological material;

wherein the first and second electromagnets are oriented such that opposite pole faces of the first and second electromagnets are coupled to each of the first and second mounting plates.

18. The soft-matrix magnetorheological material vibration isolation system of claim 15 wherein:

the magnetic core of the first electromagnet is spool shaped having outer flanges and the coil of wire is wrapped around the magnetic core in a region inside of the flanges; and the magnetic core of the second electromagnet is spool shaped having outer flanges and the coil of wire is wrapped around the magnetic core in a region inside of the flanges.

19. The soft-matrix magnetorheological material vibration isolation system of claim 15, further comprising:

a third layer of soft-matrix magnetorheological material having opposing first and second faces, the first face coupled to the first mounting plate;

a fourth layer of soft-matrix magnetorheological material having opposing first and second faces, the first face coupled to the second mounting plate; and a permanent magnet having opposite first and second pole faces, the first pole face of the permanent magnet coupled to the second face of the third layer of soft-matrix magnetorheological material, and the second pole face of the permanent magnet coupled to the second face of the fourth layer of soft-matrix magnetorheological material.

\* \* \* \* \*